United States Patent [19]

Fraser

[11] Patent Number: 5,341,943
[45] Date of Patent: Aug. 30, 1994

[54] DECORATIVE STAND FOR COMPACT DISCS

[76] Inventor: Richard J. Fraser, 123 S. G St., Hamilton, Ohio 45013

[21] Appl. No.: 43,224

[22] Filed: Apr. 6, 1993

[51] Int. Cl.⁵ ............................................... A47F 7/00
[52] U.S. Cl. ..................................... 211/40; 206/309; 312/9.9; D6/407
[58] Field of Search ........................... 211/40, 41, 1.51; 206/387, 309; 312/9.9; D6/407, 467, 468

[56] References Cited

U.S. PATENT DOCUMENTS

| | | |
|---|---|---|
| 4,355,974 | 10/1982 | Lee . |
| 4,819,801 | 4/1989 | Howard .............................. 211/40 X |
| 4,872,554 | 10/1989 | Quernemoen ..................... 211/41 X |
| 5,035,332 | 7/1991 | Stravitz . |
| 5,195,642 | 3/1993 | Dardashti ........................... 211/40 X |

OTHER PUBLICATIONS

Home Decorators Collection, Spring, 1993, p. 36.

*Primary Examiner*—Robert W. Gibson, Jr.
*Attorney, Agent, or Firm*—Charles R. Wilson

[57] ABSTRACT

A decorative stand for holding compact discs allows the discs within their cases to be individually held in a manner which facilitates their placement and removal. The decorative stand comprises a set of at least three translucent rods, a housing to hold lower ends of the rods in an upright fashion and a cap to stabilize the upper ends of the rods. Each of the rods has a set of notches in a side wall so that then the rods are properly arranged, the notches are in alignment to cooperatively hold three edges of each compact disc case. The disc cases can be readily slid into and out of the notches as needed. Illumination means within the housing are used to transmit light up through the rods to provide a pleasing appearance.

14 Claims, 3 Drawing Sheets

DECORATIVE STAND FOR COMPACT DISCS

This invention relates to a decorative stand for holding compact discs. More particularly, the invention relates to a decorative portable stand which holds several compact disc cases in a manner which allows an easy reading of identifying labels on the cases and facilitates case placement into and removal from the stand.

BACKGROUND OF INVENTION

Compact discs have become a popular mode of recording music. They are supplanting the more conventional records and tapes as a medium for recording music because of a superior clarity and tone of music which they give when played. The discs themselves are relatively thin. Care must be taken in their handling to prevent damage. They are conventionally packaged in flat, four-sided, easy open protective cases by the producer and sold as such. A label generally appears on one or more sides and the top of the case for identification purposes.

As can be readily imagined, many people enjoy a wide range of music and are always interested in acquiring the most recent and/or most popular music releases. Several compact discs can be quickly acquired. They soon begin to pile up and become unmanageable clutter. This is bothersome to most music lovers and homeowners. In accordance with a well recognized need, there have been compact disc racks and stands recently developed and commercialized. U.S. Pat. No. 5,035,332 describes a collapsible rack which is said to hold articles such as books, tapes, compact discs and the like. It has end panels and at least two rod-like cross members extending between the end panels. The rack can be used in a horizontal or vertical mode. It appears to function more as a means to stack the articles side by side or on top of one another. The rack is somewhat difficult to use unless the proper number of articles are being held. Thus, when used in the horizontal mode, the rack needs to be nearly filled to keep the articles from falling on their sides and becoming awkward to remove and unsightly. In the vertical mode, only a limited number of articles can be held. If too many, the article, e.g. a compact disc near the bottom of the pile is difficult to remove because of the weight of the articles piled directly on top. The rack is of some use, though it does have the above noted drawbacks and is not particularly attractive.

A compact disc rack advertised in Home Decorators Collection, Spring, 1993 identified as a CD Tower appears to be very functional in use. It is basically a vertical rack with slots for individually holding several compact discs. While functional, it is rather bulky and not particularly attractive. Many people place their compact disc player in a room often used by family members and usually open to visitors. Since the compact discs should be near the CD player for convenience, it follows the compact disc rack or holder ideally is appealing to the eye or, at the least, not an eye-sore.

Known racks and holders all suffer in one way or another. There is a current need for a stand to hold compact discs. The stand must be very functional in the manner it holds the compact discs and it must have a pleasing appearance. Necessarily, it also must be economical to produce. In accord with this need, there has been developed a decorative stand which is economical to produce, very functional in use and is also pleasing in appearance.

SUMMARY OF THE INVENTION

A decorative stand for holding compact discs comprises a set of at least three translucent rods, a housing at the end of the rods to receive the rods and hold them in a sturdy upright manner and a cap at the other end of the rods to stabilize the rods. Each of the rods has a series of notches on a side wall and the rods are arranged in a pattern whereby the notches of the rods are aligned to receive three edges of a compact disc case. The compact disc cases are readily slid into and out of the aligned notches as needed. The housing has illumination means within it such that light is transmitted up through the rods to provide a pleasing appearance.

DETAILED DESCRIPTION OF THE INVENTION

The decorative stand for holding compact discs of the invention is described in detail in the following paragraphs and with reference to the drawings. The decorative stand is particularly useful for holding compact discs packaged in cases having an about two inch to about five inch square shape. It should be understood the decorative stand of the invention is readily adapted to hold other shapes and sizes of compact disc cases as well as other small generally flattened articles such as tapes, books and the like. Its use as a holder for compact discs in individual cases is of most benefit and this highly preferred use is described in detail.

Figure 1:
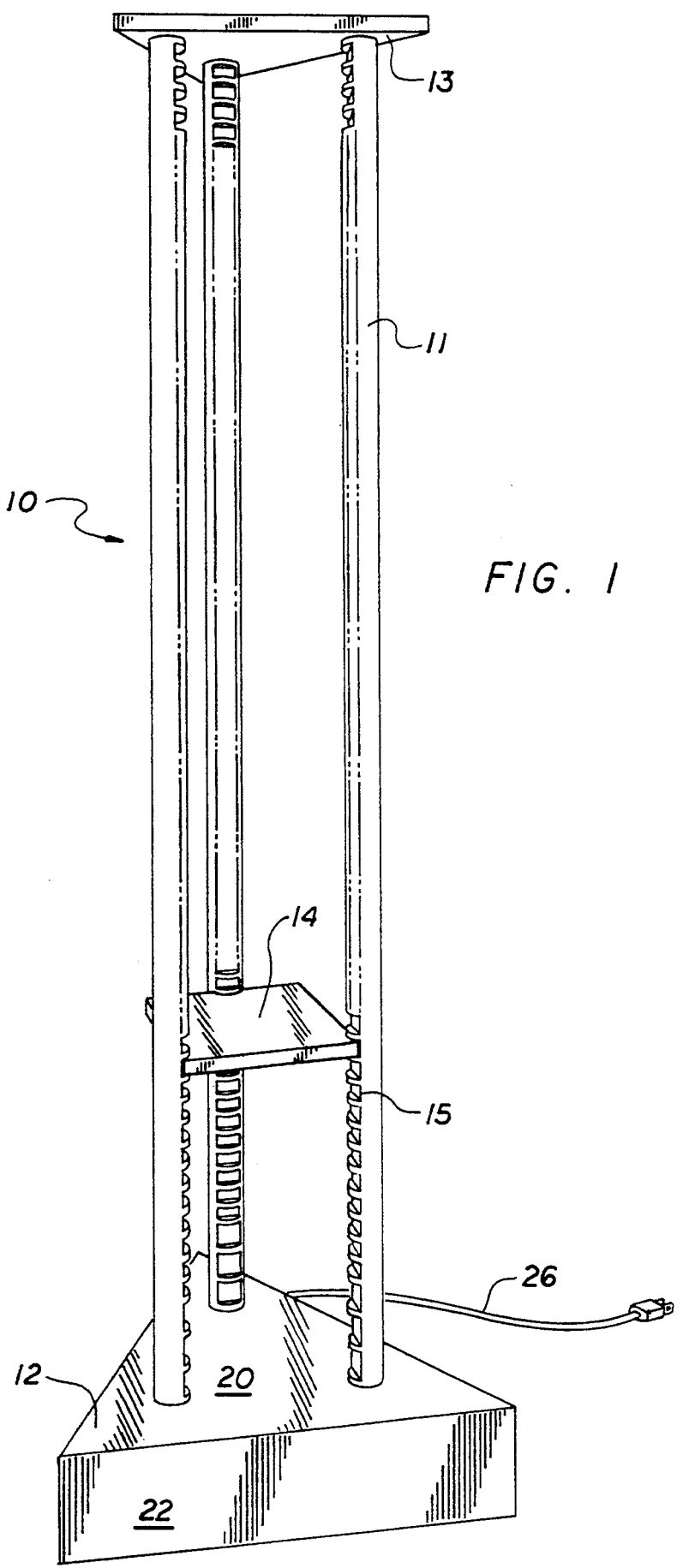
FIG. 1 is a view in perspective of the decorative stand for holding compact discs of the invention.

With reference to FIG. 1, there is shown a decorative stand 10 of the invention. The decorative stand comprises as its essential components a set of at least three translucent rods 11, a housing 12 for holding the lower ends of the rods in a steady upright 20 fashion and to transmit light up through the rods, and a cap 13 to stabilize the upper ends of the rods. For the sake of clarity, a single compact disc within a case 14 is shown being held.

The rods 11 of the decorative stand are notched and are arranged in a triangular pattern such that the notches are aligned to cooperatively receive edges of the compact disc cases. Each rod 11 has a series of notches 15 in a wall substantially along its full length. For the sake of convenience, phantom lines are used in FIG. 1 to denote several notches. Each of the notches is dimensioned to receive an edge of a conventional compact disc case. Generally, the notches are about 150 mil to about 1000 mil in height. They can all be the same size to hold only compact disc cases of one size or, as shown in FIGS. i and 2, the lower notches can be larger to hold a double compact disc case. The depth of the notches into the rods is sufficiently deep to receive and hold an edge of the case in a steady manner, allowing for careless placement by the user and the usual accidental bumping an article of this nature is likely to encounter in the home.

Preferably, the notches extend the full length of the exposed portion of the rods to maximize storage. Also preferably, the notches are substantially uniformly spaced along the rods for appearance purposes, though a staggered arrangement of the notches is feasible for possible arranging or unique appearance purposes. About five to about twenty-five notches for linear foot appears ideal. The notches in the rods of the decorative stand 10 are arranged on the three rods such that each notch is aligned with a notch in each of the other two rods in a substantially horizontal plane. As such, a compact disc case slid into the proper set of three aligned notches will also be substantially horizontal. It should be understood the respective notches on a rod can be offset from notches on the other two rods to cause the compact disc cases to sit at a tilt, e.g. up to about thirty degrees from the horizontal.

The rods of the decorative stand preferably have a circular cross-section. Rods of another cross-sectional shape such as an oblong, triangular, square or rectangular shape are possible. However, the circular cross-sectional rods are readily available, readily machined and lend a very pleasing appearance to the stand and, for all these reasons, are very preferred. They range in length from about one foot to about eight feet with the minimum length dictated by the resultant limited number of compact disc cases that can be held and the maximum length dictated more by the limited reach of most people. A rod diameter of from about one-half inch to about two inches is typical. Generally, rods of from about two feet to about six feet, preferably about three feet to about five feet in length strike an optimum balance between storing as many discs in one place as possible and home decorating desires.

Rods used in the decorative stand are translucent. They allow light to be transmitted through them. The rods 11 of the decorative stand 10 are clear. They can as well be tinted any desired color or be opaque depending on desired eye appeal. The rods are rigid and made of a durable polymeric or ceramic material. Acrylic rods are highly preferred because of their strength and ability to transmit light.

The housing 12 of the decorative stand 10 is used as a base for the rods 11. It serves to hold the rods in an upright fashion by securing lower ends of the rods. The housing also holds illumination means to illuminate the rods for appearance purposes. The housing 12 has a triangular shape with a triangular top wall 20, a triangular bottom wall 21 and three side walls 22. The top wall 20 has holes to receive the lower ends of the rods 11. The holes are positioned to receive the rods in the proper arrangement as above discussed and are generally equi-spaced from edges of the top wall for appearance purposes. Holding means within the housing 12 are needed to rigidly hold the rods in place. For reasons apparent below, the ends of the rods do not extend to the bottom wall 21 of the housing. The terminuses of the rods are held at an intermediate position within the housing. The top wall of the housing if sufficiently thick together with attaching means such as right angle brackets, adhesive or the like can serve as the holding means.

Figure 2:
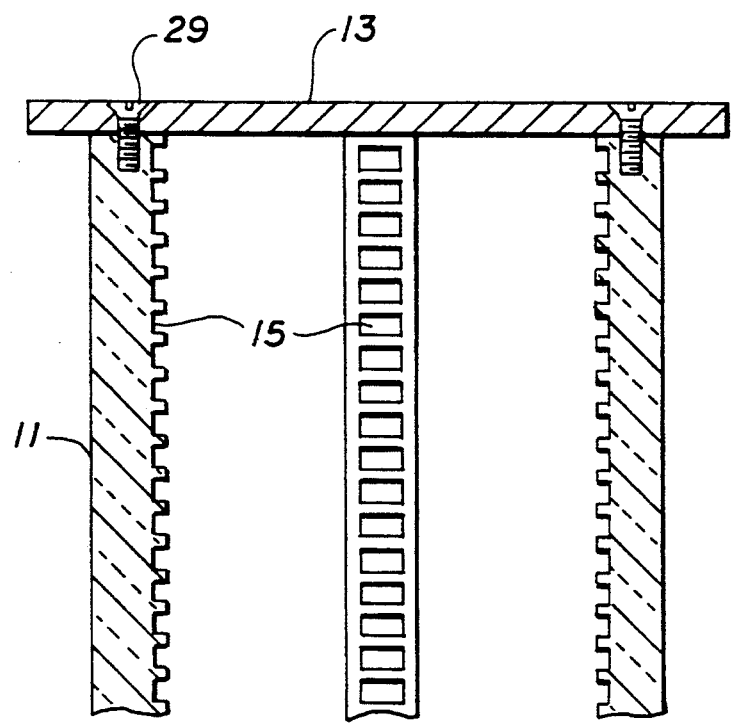
FIG. 2 is a side view in section of the decorative stand of FIG. 1.
Figure 2:
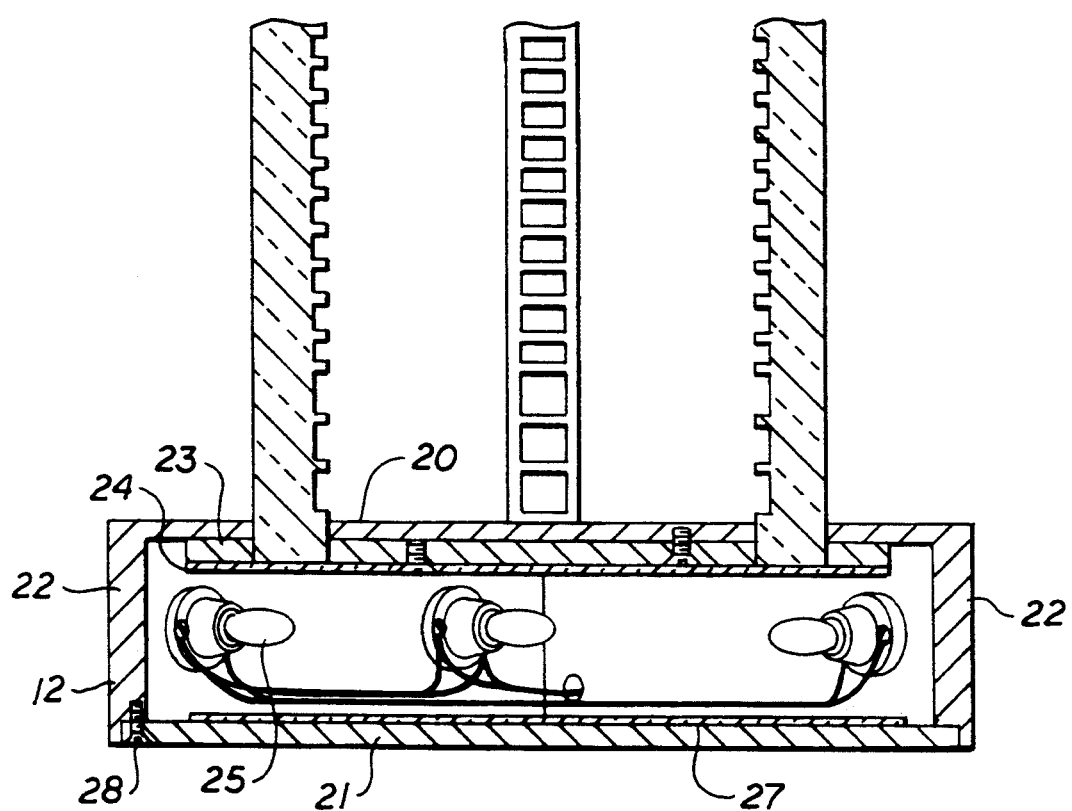

As evident in FIG. 2, a rigid intermediate support base 23 is attached to the underside of the top wall 20 within the housing. A set of holes is provided in the support base 23 so as to be in alignment with the holes in the top wall 20. A substantially transparent retaining wall 24 preferably of clear plastic about 100 mil to about 300 mil thickness is attached to the bottom of the rigid support base. The terminuses of the three rods 11 rest directly on the transparent retaining wall 24. This holding means for the rods provides the necessary rigidity to keep the rods in a substantially upright or vertical position and still allows light to be transmitted up through the rods.

Individual light bulbs 25 are positioned within the housing so as to be directly below each of the rod terminuses. The bulbs are wired in a conventional fashion. An electric cord 26 extends through a wall of the housing. Preferably a switch is provided in the cord to allow the light bulbs to be lit as desired. When the cord 26 is plugged into an electric outlet, light from the bulbs shines through the transparent retaining wall 24 and is transmitted throughout the length of the translucent rods 11. The bulbs can be colored depending on the user's taste. Generally, a low wattage bulb of from about seven watts to about ten watts is sufficient to provide the needed intensity for the light to be transmitted to the far end of the rods. A single bulb can be used as the illumination means, though as shown a light bulb 25 directly under each rod terminus gives the desired light transmitting power without an excessive heat build-up within the housing.

The intensity of light from the illumination means is enhanced by securing a reflective object such as a mirror 27 on the bottom wall 21 within the housing 12. The mirror directs light from the bulbs 25 back up and partially into the rods 11.

The bottom wall 21 of the housing 12 is removably secured to the housing. Access must be made to the inside of the housing to occasionally replace a burned out bulb or perhaps to change the color of the bulb to create a different color appearance in the rods. Screws 28 are most conveniently used to secure the bottom wall 21 to the housing, though other conventional attaching means can be used.

Positioned at the upper ends of the rods 11 is the cap 13 to stabilize the rods. The cap 13 is held to the upper terminuses of the rods by screws 30 extending through the cap and directly into the ends of the rods. The cap 13 is triangular-shaped to match the shape of the housing 12. The decorative stand 10 normally looks best if the housing and the cap are the same shape. Optionally, a reflective surface is placed at the end of the each of the rods between it and the cap to help intensify the light at this remotest distance from the source of illumination. Aluminum foil or some other reflective means can be used.

Figure 3:
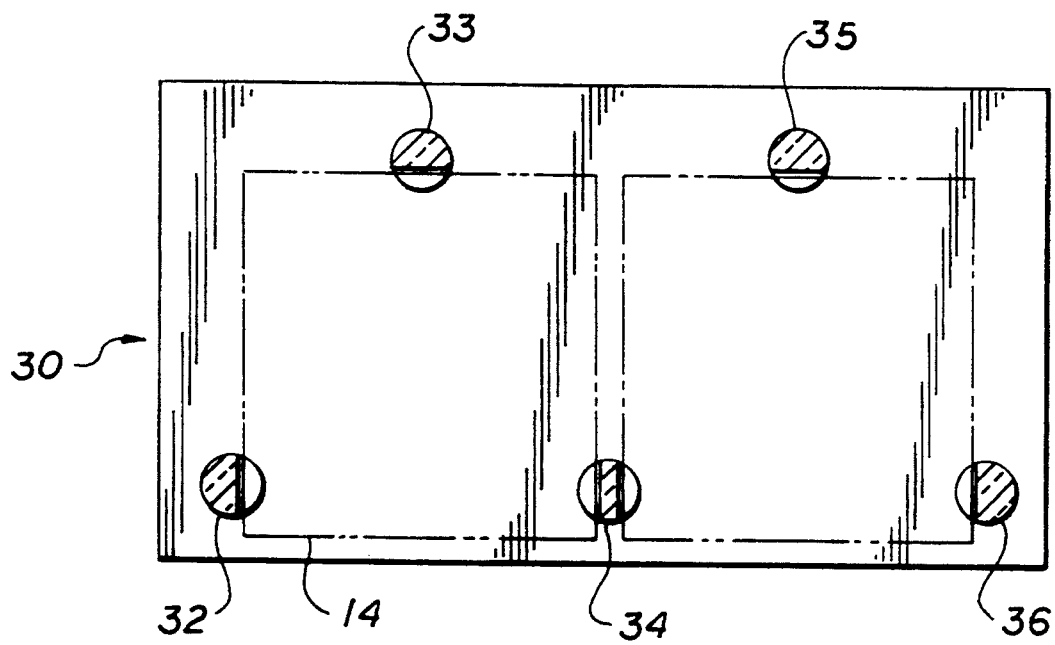
FIG. 3 is a top view partially in section of a decorative stand of the invention showing another rod placement pattern for holding compact discs.

Other shaped housings and caps are feasible with the triangular rod arrangement shown in FIG. 1. For example, a circular-, oblong-, square- or rectangular-shaped housing and/or cap can be used for whatever special design appearance is desired. Other rod pattern arrangements are also possible provided the notches in the rod side walls are properly aligned. As evident with reference to FIG. 3, a double tier of compact disc cases is possible when five rods are arranged in a pattern which forms two distinct compact disc case holding arrangements. Thus, the decorative stand 30 has a rectangular-shaped housing 31 with rods 32-36 held in an upright position. Rods 32-34 form a triangle. Each of the rods are notched to be in the proper alignment to receive a compact disc case edge as above described with reference to FIGS. 1 and 2. Rods 34-36 are also arranged to form a triangle. These rods are also notched in the same manner. The rod 34 is notched on at least two sides and serves to hold edges of two different compact discs in a side by side stacking arrangement.

Figure 4:
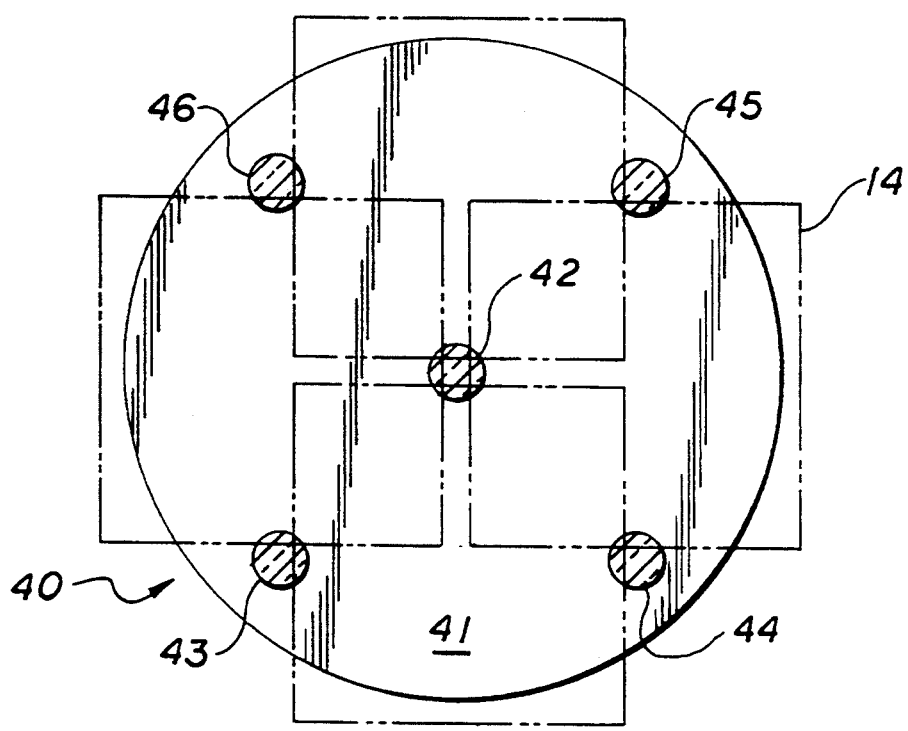
FIG. 4 is a top view partially in section of a decorative stand of the invention showing still another rod placement pattern for holding compact discs.

FIG. 4 shows another decorative stand with a rod arrangement that permits a four tier stacking arrangement of compact disc cases. The stand 40 has a circular-shaped housing 41 with five rods 42–46. A central rod 42 is notched completely around its perimeter. It serves to hold edges of four different compact disc cases at the same elevation. The perimeter rods 43–46 are equi-spaced around the central rod 42 at about ninety degree angles such that four receiving openings are formed. The perimeter rods are notched to be in alignment with its adjacent perimeter rod and the central rod.

In use, the decorative stand is placed in its upright position normally near the user's compact disc player. Individual compact discs in their cases are slid fully into aligned notches on the rods as desired. If desired, the illumination means can burn continuously, though normally is switched on only when the room is being used. The decorative stand gives its most pleasing appearance when the room is dimly lit. The stand is very functional in that it holds several compact discs at one time. The disc cases are easily identified, removed and replaced. The stand is also attractive and especially provides a pleasing appearance when lit.

While the invention has been described with particular reference to the drawings it should be understood various modifications can be made. All such changes of an obvious nature are considered within the scope of the appended claims.

I claim:

1. A decorative stand for holding compact disc cases in a manner facilitating their placement and removal from the stand, comprising:
   (a) a set of at least three translucent rods, each said rod having a series of notches in a side wall thereof to receive an edge of the compact disc case, said rods arranged together so that the notches cooperate to slidably receive three edges of each compact disc case;
   (b) a housing to hold a lower end of each of the rods in a upright fashion and to illuminate the rods, said housing having (i) a top wall with a set of holes to receive the ends of the rods and to maintain said rods in the arranged pattern, (ii) holding means within the housing to hold the rods off a bottom wall of the housing, and (iii) illumination means mounted within the housing and below the rods such that light is transmitted through the rods to provide a pleasing appearance; and
   (c) a cap attached to an upper end of each of the rods as an aid in stabilizing the rods.

2. The decorative stand of claim 1 wherein the illuminating means is a set of light bulbs positioned within the housing, each light bulb being directly below a rod terminus.

3. The decorative stand of claim 1 further comprising a mirror within the housing on a bottom wall thereof to intensify the transmission of light from the illuminating means through the rods.

4. The decorative stand of claim 1 having three rods arranged in a triangular shape.

5. The decorative stand of claim 1 wherein the rods are from about two feet to about six feet in length.

6. The decorative stand of claim 5 wherein each rod has from about five to about twenty-five notches per linear foot.

7. The decorative stand of claim 6 wherein the notches in the rods are positioned along the rods in a manner to cause the compact disc cases to sit in the stand in a substantially horizontal plane.

8. The decorative stand of claim 6 wherein the notches in the rods are positioned along the rods in a manner such that they are offset from one another to cause the compact disc cases to sit in the stand at a noticeable tilt.

9. The decorative stand of claim 1 wherein the rods are arranged in a triangular configuration and the housing and the cap are triangular in shape.

10. The decorative stand of claim 5 wherein the rods have a diameter of from about one-half inch to about two inches.

11. The decorative stand of claim 1 wherein the holding means for the rods is an intermediate rigid support base attached to the underside of the top wall of the housing, said support base having a set of holes to receive ends of the translucent rods and hold them in a suspended state within the housing.

12. The decorative stand of claim 11 further comprising a substantially transparent retaining wall attached to the bottom of the intermediate rigid support base to hold the rods in the suspended state.

13. The decorative stand of claim 1 having five rods arranged to form two triangular shapes such that a double tier of compact disc cases are held by the notches in the rods.

14. The decorative stand of claim 13 wherein the housing and the cap are rectangular in shape.

* * * * *